United States Patent [19]

Leggat

[11] Patent Number: 4,901,601

[45] Date of Patent: Feb. 20, 1990

[54] PLANETARY CARRIER ASSEMBLY AND METHOD

[75] Inventor: Angus B. Leggat, Livonia, Mich.

[73] Assignee: General Motors Corporation, Detroit, Mich.

[21] Appl. No.: 270,854

[22] Filed: Nov. 14, 1988

[51] Int. Cl.⁴ ............................................. F16H 3/44
[52] U.S. Cl. .................................. 475/348; 29/893.1; 29/893.2; 475/280; 475/331
[58] Field of Search ..................... 74/750 R, 801, 797, 74/753; 29/159.2

[56] References Cited

U.S. PATENT DOCUMENTS

| | | | |
|---|---|---|---|
| 3,667,324 | 6/1972 | Laing | 74/750 R X |
| 4,043,021 | 8/1977 | Mosbacher et al. | 74/750 R X |
| 4,189,960 | 2/1980 | Holdeman | 74/750 R X |
| 4,721,014 | 1/1988 | Ohkuba | 74/750 R |
| 4,756,212 | 7/1988 | Fuehrer | 74/750 R |
| 4,793,214 | 12/1988 | Nürnberger et al. | 74/750 R |

Primary Examiner—Dwight G. Diehl
Assistant Examiner—Christopher Campbell
Attorney, Agent, or Firm—Donald F. Scherer

[57] ABSTRACT

A carrier assembly has a pair of side plates with axially aligned apertures in which are disposed pin members for rotatably supporting pinion gears. Each pin member has a slot which is alignable with a groove formed in one of the side plates. A locking plate has radially extending tab members which are positionable in respective ones of the groove and slots by simultaneous rotation of the pins and locking plate about their respective axis during assembly. A spring pin or roll pin is secured in an aperture in the grooved side wall and cooperates with a notch in the locking plate to prevent rotation thereof relative to the side plate after assembly with the pins.

3 Claims, 2 Drawing Sheets

PLANETARY CARRIER ASSEMBLY AND METHOD

BACKGROUND OF THE INVENTION

This invention relates to planetary gear structures and more particularly to the planet carrier assembly of such structures, and a method of assembling the planet carrier.

Prior art planet carrier assemblies generally provide for one of three methods for retaining the pinion mounting pins in the carrier housing. The pins are either press-fit within the housing or retained therein by a cover held to the housing by threaded fasteners or through the use of a snap ring or locking ring. Generally with the use of a snap ring or locking ring, the carrier is manufactured to have a shoulder for reduced diameter in one portion thereof to limit the movement of the pins in one direction and the locking ring is secured in another portion of the carrier to prevent movement of the pin in the other direction.

Another common method of securing the pins in the carrier housing is to utilize a light pressfit followed by a swaging operation which offsets the ends of the pins to provide a secure assembly.

While these prior art mechanisms provide useful articles, the present invention provides for a simpler assembly with less machining operations.

SUMMARY OF THE INVENTION

The present invention provides for a carrier assembly wherein the side plate portions of the carrier housing are through-bored to provide a mounting aperture for the pins which are placed therein. One of the side plates has a radially extending slot which intersects a radially inward portion of the through-bore. The pin has a slot formed in a segmental portion of its cylindrical envelope. The pins are assembled in the through-bore such that the slot is aligned with but oblique to the groove in the carrier side wall.

To complete the assembly, a latching plate having a plurality of locking tabs is installed in the side plate and rotated relative to the central axis thereof to move into registration with the slot in the pins. The pins are simultaneously rotated on their individual axes to permit the complete registration of the locking tabs within the slot. The locking plate is prevented from further rotation relative to the carrier by the installation of a roll pin in a notch formed on the latching plate and the locking tabs prevent rotation of the pins.

It is therefore an object of this invention to provide an improved carrier assembly, wherein a carrier housing has a pair of spaced side plates each having a plurality of bores formed therein, and wherein one of the side plates has an interrupted annular groove intersecting the bores, and further wherein a plurality of pinion mounting pins are disposed between the side plates and rotatably mounted within the bores, and also wherein each pin has a slot portion which is aligned with the interrupted groove and registers with a locking tab on a latch plate which is nonrotatably maintained on the side plate by a retaining member.

It is another object of this invention to provide an improved method of assembling a planet carrier wherein a plurality of slotted pins are installed in bores formed in the carrier housing and aligned with a groove also formed in the housing, after which a locking plate having radially extending tabs is rotated with the tabs registering in the grooves and slots thereby preventing axial and rotary movement of the pins, and further wherein a means is provided for connecting the locking plate with the carrier housing to prevent relative rotation therebetween.

These and other objects and advantages of the present invention will be more apparent from the following description and drawings.

DESCRIPTION OF AN EXEMPLIFIED EMBODIMENT

Figure 1:
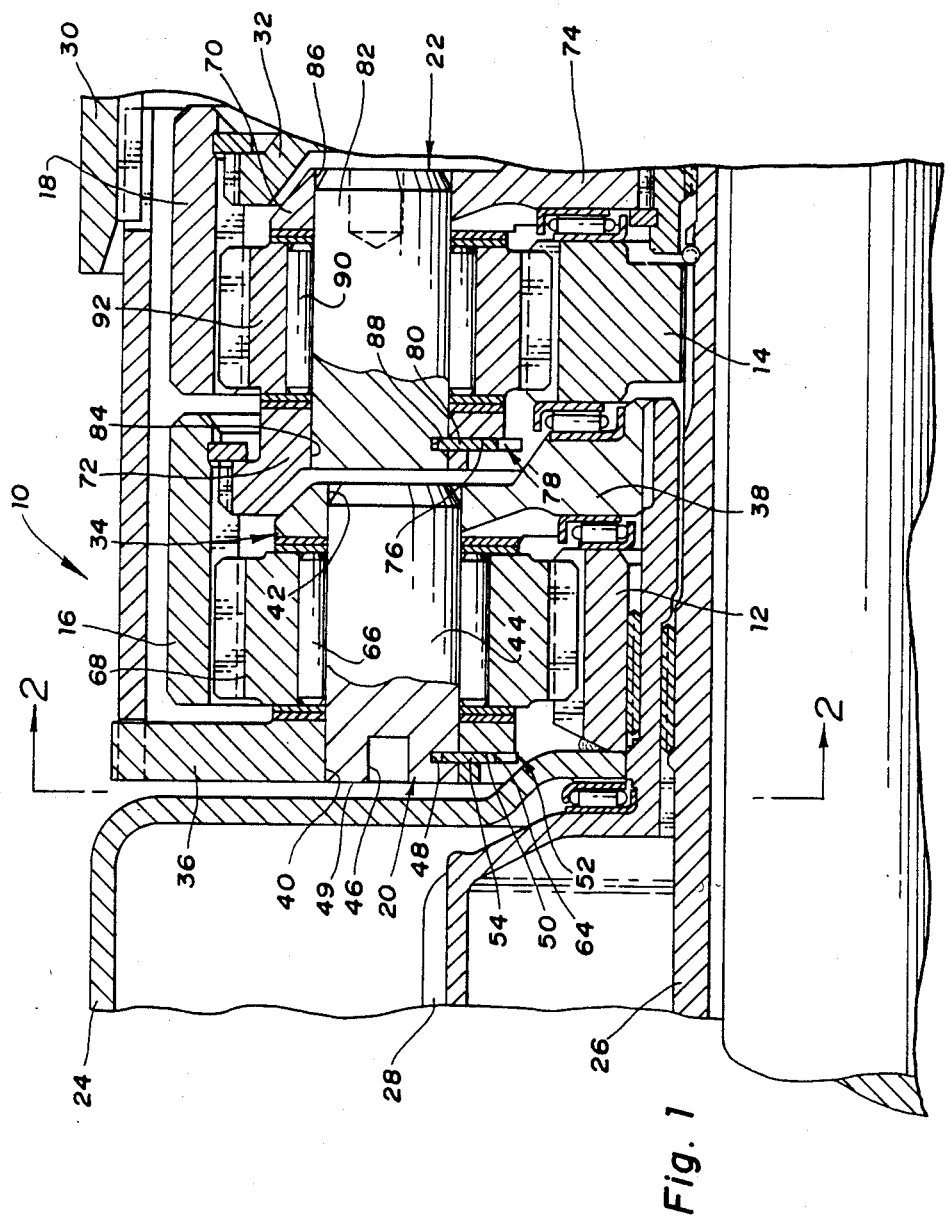
FIG. 1 is a cross-sectional elevational view of a portion of a planetary transmission incorporating planet carrier assemblies utilizing the present invention.

Referring to the drawings, wherein like characters represent the same or corresponding parts throughout the several views, there is seen in FIG. 1 a planetary carrier arrangement, generally designated 10, which includes a pair of sun gears 12 and 14, a pair of ring gears 16 and 18, and a pair of planet carrier assemblies 20 and 22. The sun gears 12 and 14 are connected with a hub 24 and sleeve shaft 26, respectively. The planet carrier assembly 20 is connected with a hub 28 and a hub 30. The hubs 24 and 28 and sleeve shaft 26 may be selectively connected with a transmission input through the use of selectively engageable friction clutch devices in a well known manner.

Each of these hubs 24, 28 and sleeve shaft 26 may also be connected with a selectively operable brake member to provide a reaction element within the planetary gearset. The hub 30 can be connected with a brake member which is selectively engageable to establish the carrier assembly 20 as a reaction member within the planetary arrangement 10.

The ring gear 16 is drivingly connected with the planet carrier assembly 22, which in turn can be connected with the transmission output shaft. The ring gear 18 is connected with a hub 32 which may be held stationary by a selectively engageable brake, not shown.

The operation of planetary gear arrangement 10 is well known and such gear arrangements have been utilized in commercially available transmissions. Through the judicious selection of clutches and brakes, the planetary gear arrangement is operable to provide four forward speed ratios, a neutral condition and a reverse speed ratio between a prime mover, such a an internal combustion engine and a vehicle final drive mechanism. The operation of planetary gearsets is well known and it is not believed that a description is necessary at this point for a full understanding of the present invention.

The present invention is concerned with the planet carrier assemblies 20 and 22 and in particular, the assembly of pins and gears within the carrier assemblies 20 and 22. The planet carrier assembly 20 includes a planet housing 34 having a pair of side plates 36 and 38. The side plates 36 and 38 are interconnected and generally manufactured as a single casting. The side plate 36 has a plurality of bores 40 and the side plate 38 has a plurality of bores 42. These bores 40 and 42 are axially aligned in pairs and each pair of bores 40 and 42 has disposed therein a pin 44.

Figure 2:
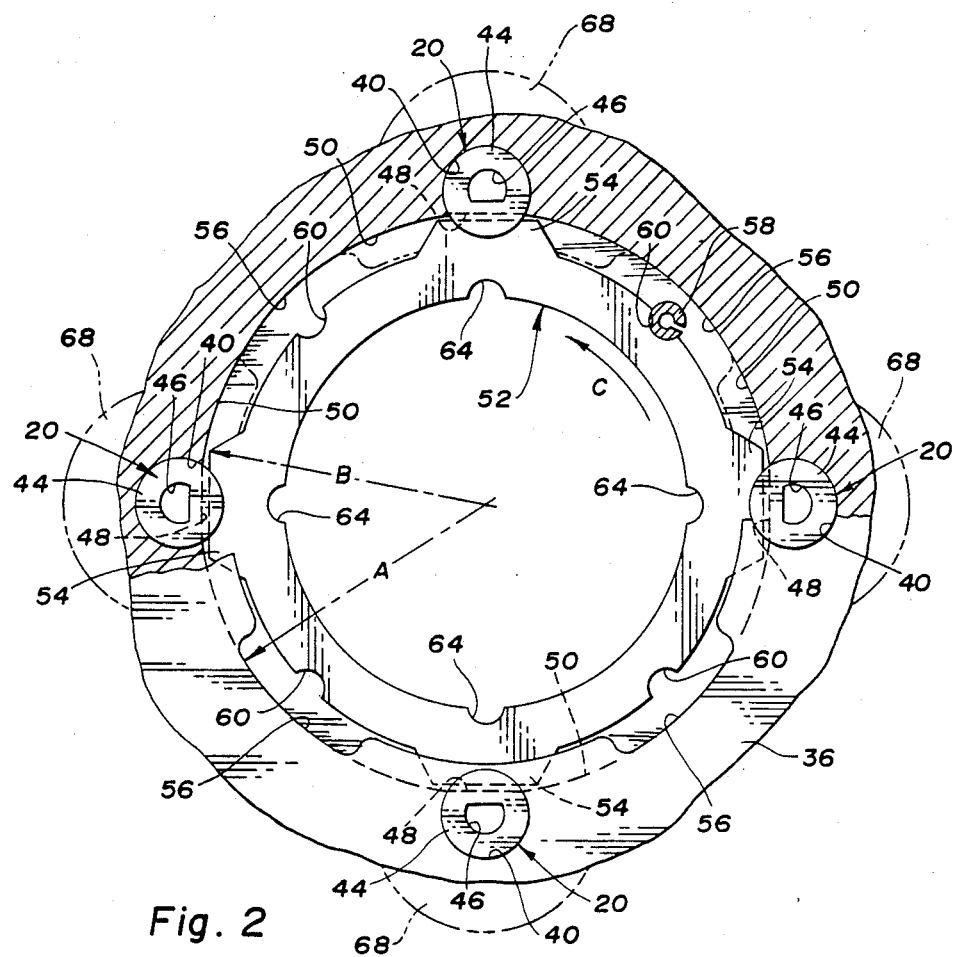
FIG. 2 is a view taken along line 2——2 of FIG. 1.
Figure 3:
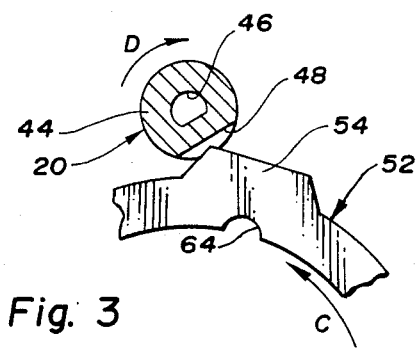
FIG. 3 is a diagrammatic representation of the interconnection occurring between the pinion pin and the latching plate.

As seen in FIG. 2, there may be four such pins 44 distributed substantially equiangularly in the carrier housing 34. The pins 44 are sized to have a sliding fit within the bores or apertures 40 and 42 and each pin 44 has formed therein a drive opening 46. Each pin 44 also has formed therein a slot or segmental groove 48. As best seen in FIGS. 2 and 3, the slot 48 removes only a segment of the cylindrical material of the pin 44 laterally inward of the end 49.

The side plate 36 has an interrupted groove or slot 50 formed therein which will be aligned with each slot 48 when the pins 44 are assembled within the carrier side plate 36. A latching plate or locking plate 52 has a plurality of locking tabs 54 which are aligned in the interrupted groove 50 and the slots 48. As seen in FIG. 1, the tabs 54 will be effective to prevent longitudinal movement of the pin 44 along its rotary axis, and as seen in FIG. 2, the interaction between the locking tab 54 and slot 48 will prevent rotation of the pin 44 about its rotary axis.

The side plate 36 has a plurality of circumferentially extending openings 56 formed therein at a radius A from the center of the side plate 36 which interrupt the slot 50. The outer surface of tabs 54 have a maximum radius B which is less than the radius A of openings 56. To assemble the latching plate 52 and the side plate 36, the tabs 54 are axially aligned with the openings 56 and the plate is moved longitudinally until the tabs 54 align with the interrupted groove 50. At this point, the pins 44 have been assembled within their respective bores 40, 42. As seen in FIG. 3, the pins 44 are rotatably positioned so that the slot 48 is skewed to the outer surface of tab 54 and also to the interrupted groove 50.

To complete the assembly of the tab 54 in the groove 50, the latching plate 52 is rotated about its axis in the direction of Arrow C while the pins 44 are simultaneously rotated about their axis in the direction of Arrow D. As the pins are rotated in the direction of Arrow D, the slot 48 will be fully aligned with the groove 50 and the tab 54.

By establishing the depth of slot 48 and the radius B of tab 54, it is possible to utilize the registration of the pins 44 and latching plate 52 to prevent the rotation of the pins 44 about their axis. It is likewise possible to prevent the rotation of latching plate 52 about its axis. However, since the two members can be rotated into engagement, it stands to reason they can be rotated out of engagement. To prevent this from accordingly occurring, a roll pin or spring pin 58 is secured in an aperture formed in the side plate 36 in overlapping relationship with a notch 60 formed in the locking plate 52. Thus, the latching plate 52 will not rotate relative to the side plate 36.

As seen in FIG. 2, there are a plurality of notches 60 such that orientation of any particular tab 54 of the locking plate 52 is not critical during assembly. The locking plate 52 also has a plurality of notches 64 which are formed facing radially inward such that in some assemblies, the roll pin 58 could be placed in an aperture radially inward from the tab 54, depending on the design of the carrier side plates. Both sets of notches 60 and 64 are not required since only one roll pin is needed to establish the relative angular positions of the latching plate 52 and carrier housing 34.

The pins 44 each have a roller bearing 66 and pinion gear 68 mounted thereon. The pinion gears 68 are components of the planetary carrier assembly 20 and establish an intermeshing relationship between the sun gear 12 and the ring gear 16 in a well known manner.

The carrier assembly 22 includes a planet carrier housing having a pair of side plates 72 and 74 which provide a structure similar to that described above for side plates 36 and 38. The side plate 72 has an interrupted groove 76 in which is disposed a latching or locking plate 78. The locking plate 78 has tabs 80 which engage respective ones of a plurality of pins 82 which are rotatably mounted in bores or aperture 84 and 86 formed in the side plates 72 and 74, respectively.

Each pin 82 has formed therein a slot or segmental groove 88 which cooperates with the tab 80 in the same manner as described above for tab 54 and slot 48. The pins 82 each have disposed thereon a roller bearing 90 and pinion gear 92. Each pinion gear 92 meshes with the sun gear 14 and ring gear 18 in a well known manner. The assembly of the pins 82 and latching plate 78 are similar to that described above for pins 44 and latching plate 52.

It should now be apparent that the assembly of the planet carrier with the pins and gears is accomplished very simply and easily. It does not require staking operations or the insertion of snap rings, such as required by the prior art. The only pressing operation required is the pressfit between the roller pin 58 and the side plate 36. This operation does not require the use of heavy equipment such as that required to pressfit pinion pins into the carrier side plates or the heavy equipment necessary for a staking operation.

The carrier side plates are through-bored to form the apertures 40 and 42 or 84 and 86. This is a much simpler machining operation than the use of a step bore. As described above, the step bore s used by the prior art to locate one end of the pinion pins. Also, the pinion pins in the present invention, being a single diameter cylinder, can be finish machined on a centerless grinder without the use of specially designed grinding wheels. In the prior art, wherein a stepped or shoulder pinion is utilized, special grinding operations are required.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A planet carrier assembly comprising: a pair of spaced side plates, one of said side plates having an inner periphery with an interrupted annular groove facing radially inward formed therein and a plurality of axially facing opening means for permitting access to the annular groove in an axial direction; a plurality of pairs of apertures axially aligned in said side plates and being equally radially and circumferentially spaced thereon; pin means disposed in each pair of apertures extending between said side plates; gear means supported on each pin member; a slot formed in each pin member being alignable with said annular groove; and a locking plate having an outer periphery less than said inner periphery of said one side plate and a plurality of tab means extending radially outward therefrom and having an outer radial dimension substantially equal to an outermost radial dimension of said annular groove and being registered with respective ones of said slot in said pin members and cooperating with said slot and said annular groove for preventing axial and rotary movement of said pin members relative to said side plates.

2. A method of assembling a locking plate and a planet carrier assembly wherein the planet carrier assembly has a pair of side plates rotatably mounting a plurality of slotted pin members, one of said side plates having a radially inward facing groove formed therein, said groove being interrupted by axially facing openings, said locking plate having a plurality of radially extending tabs, said method comprising: aligning said locking plate with said tabs in said axially facing openings and coplanar with respective ones of said slots and said groove and being disposed adjacent said pins; positioning said pins to establish said slots in facing relation with said respective tabs; simultaneously rotating said pins on their respective axes and said plate on its axis to register said tabs in said slots and said groove; and inserting retaining means in one of said side plates for connecting said locking plate with said side plate in a manner to prevent relative rotation therebetween.

3. A planet carrier assembly comprising: a pair of spaced side plates, one of said side plates having an inner periphery with an interrupted annular groove facing radially inward and having a first predetermined diameter, and a plurality of axially facing opening means each having a second predetermined diameter greater than said first predetermined diameter for permitting access to the annular groove in an axial direction; a plurality of pairs of apertures axially aligned in said side plates and being equally radially and circumferentially spaced thereon; pin means disposed in each pair of apertures extending between said side plates gear means supported on each pin member; a slot formed in each pin member and being alignable with said annular groove; a locking plate having an outer periphery less than said inner periphery of said one side plate and a plurality of tab means extending radially outward therefrom and said locking plate having an outer radial dimension substantially equal to the radial dimension of said first predetermined diameter and said dab means being registered with respective ones of said slots and cooperating with said slots and said annular groove for preventing axial and rotary movement of said pin members relative to said side plates; and retaining means secured to said one side plate and registering in a notch in said locking plate for limiting relative rotary motion between said locking plate and said one side plate.

* * * * *